F. N. SMITH & G. P. BOOTHE.
CLAMPING RING FOR PIPE COUPLINGS.
APPLICATION FILED JULY 31, 1908.
944,748.
Patented Dec. 28, 1909.
3 SHEETS—SHEET 1.
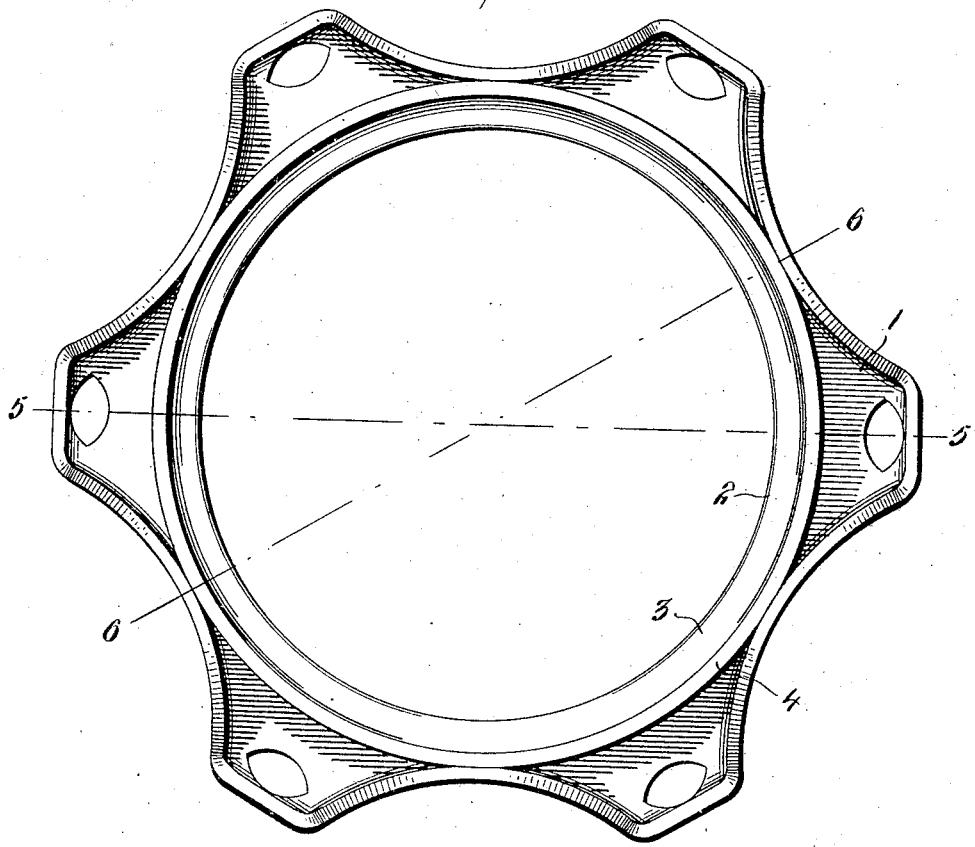
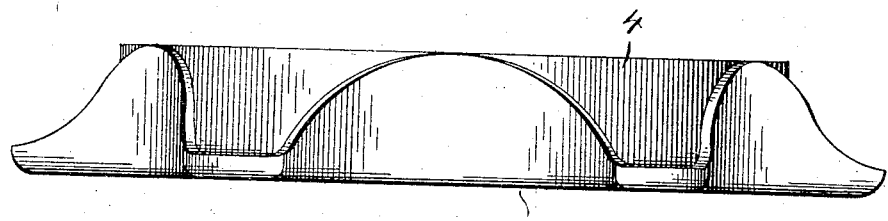

F. N. SMITH & G. P. BOOTHE.
CLAMPING RING FOR PIPE COUPLINGS.
APPLICATION FILED JULY 31, 1908.

944,748.

Patented Dec. 28, 1909.
3 SHEETS—SHEET 2.

WITNESSES:

INVENTORS
Frank N. Smith and
George P. Boothe
BY
Attorneys

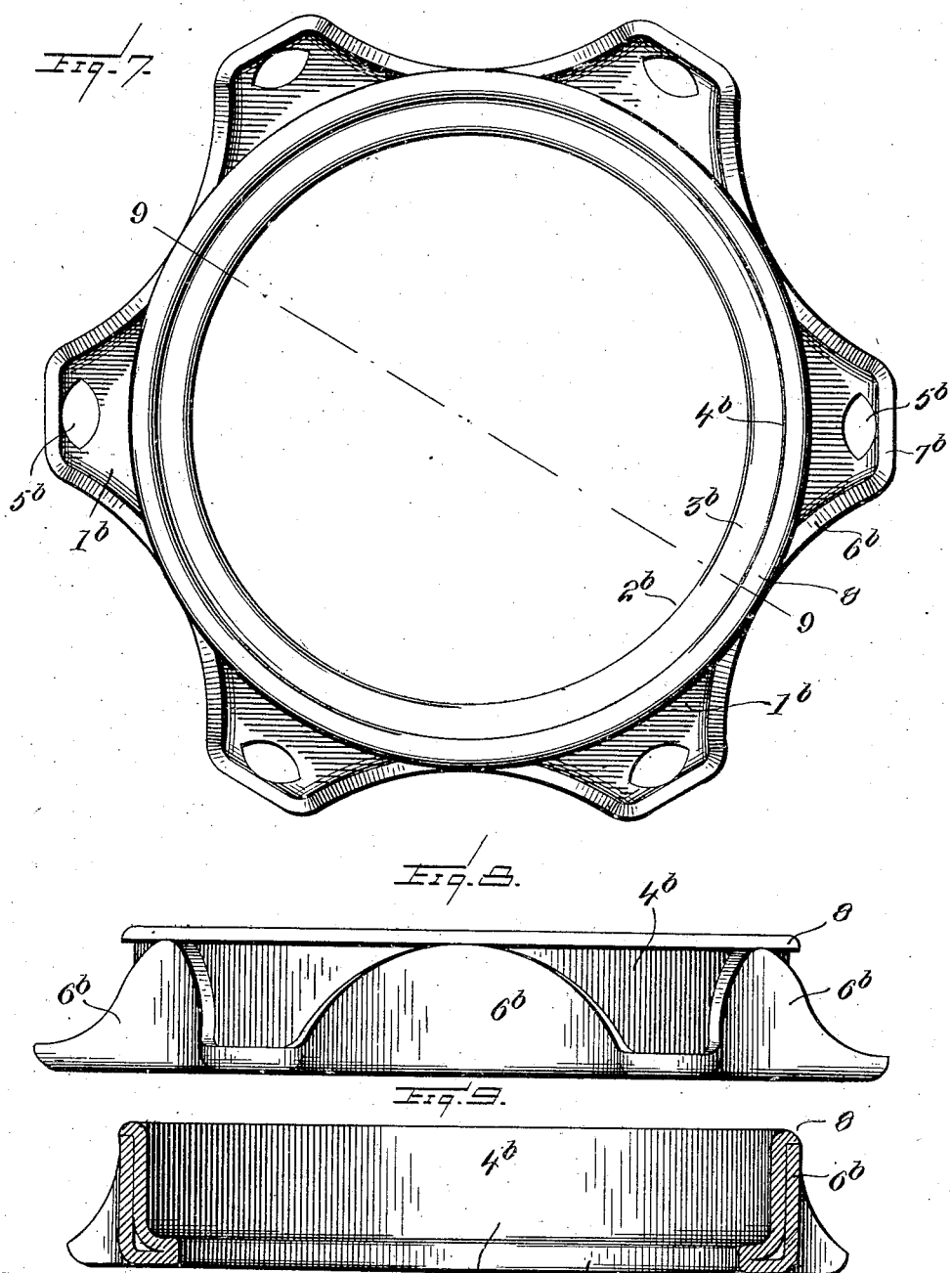

UNITED STATES PATENT OFFICE.

FRANK N. SMITH AND GEORGE P. BOOTHE, OF BRADFORD, PENNSYLVANIA, ASSIGNORS TO S. R. DRESSER MANUFACTURING COMPANY, OF BRADFORD, PENNSYLVANIA.

CLAMPING-RING FOR PIPE-COUPLINGS.

944,748.  Specification of Letters Patent.  Patented Dec. 28, 1909.

Application filed July 31, 1908. Serial No. 446,288.

*To all whom it may concern:*

Be it known that we, FRANK N. SMITH and GEORGE P. BOOTHE, citizens of the United States, residing at Bradford, in the county of McKean and State of Pennsylvania, have invented certain new and useful Improvements in Clamping-Rings for Pipe-Couplings; and we do hereby declare the following to be a full, clear, and exact description of the invention, such as will enable others skilled in the art to which it appertains to make and use the same.

Our invention consists in the novel features hereinafter described, reference being had to the accompanying drawings, which illustrate one form in which we have contemplated embodying the invention and a modification thereof, and said invention is fully disclosed in the following description and claims.

The object of our invention is to produce a clamping ring for pipe couplings formed in one piece and preferably of wrought metal, such as sheet steel or wrought iron, and comprising a flat plate member disposed perpendicularly to the axis of the ring, and having a central aperture, and a flange member having portions extending from the pipe aperture outwardly and then laterally (or perpendicularly to the plane of the plate member), the plate member being provided with bolt holes and having marginal portions thereof between the bolt holes bent laterally (or perpendicularly to the plane of the plate member), and having their central portions in contact with the exterior surface of the flange member, so as to reinforce the same, and also to render the plate member very rigid. This construction permits the ring to be made of comparatively light or thin sheet material with great economy while preserving the necessary strength. The portions of the flange member and plate member adjacent to the pipe aperture are preferably in contact thus mutually reinforcing each other and adding to the strength of the ring.

Figure 3:
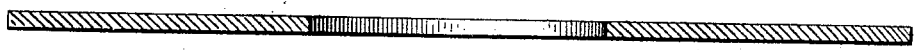
Figure 4:
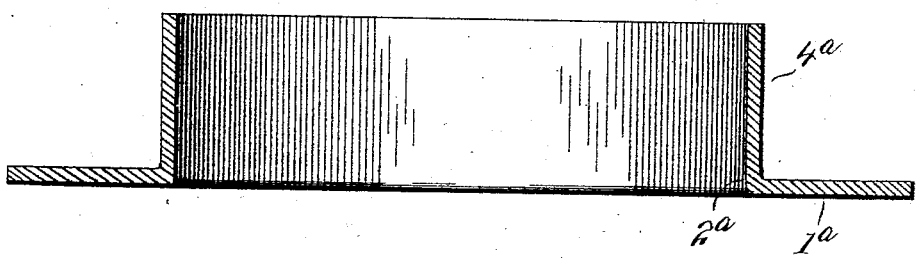
Figure 5:
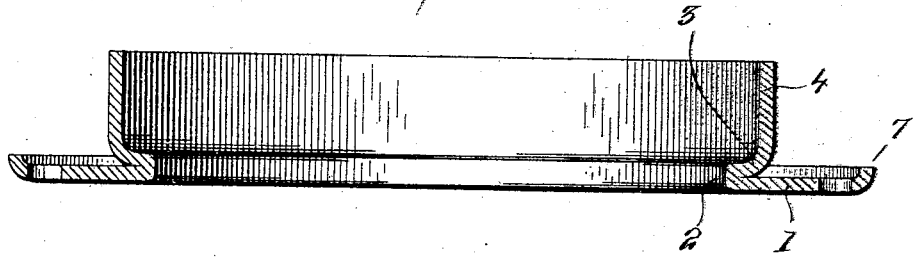
Figure 6:
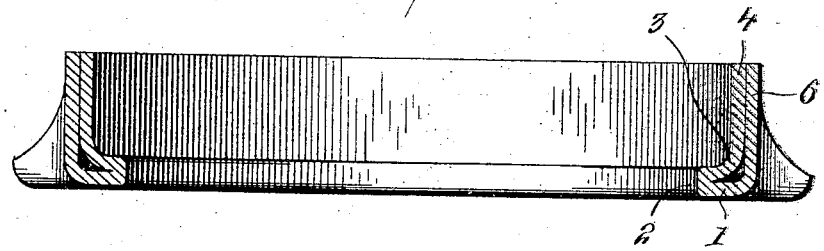

In the drawings, Figure 1 represents a plan view of our preferred form of clamping ring embodying the invention. Fig. 2 is a side elevation of the same. Fig. 3 is a sectional view of the blank from which the ring is preferably made. Fig. 4 represents the appearance of the blank at an intermediate stage of its formation. Fig. 5 is a section of the completed ring on line 5—5 of Fig. 1. Fig. 6 is a section of the ring on line 6—6 of Fig. 1. Fig. 7 is a plan view of a slightly modified form of ring embodying our invention. Fig. 8 is a side elevation of the same. Fig. 9 is a sectional view of the ring on line 9—9 of Fig. 7.

Referring particularly to Figs. 1, 2 and 6 which illustrate our improved ring in plan, elevation and section respectively, 1 represents the portion of the ring which we term the "plate member" and which is disposed in a plane perpendicular to the axis of the ring and is provided with a central pipe aperture 2. From this central pipe aperture 2 the portion of the ring which we term for convenience the "flange member" and which is integral with the plate member, extends outwardly as at 3, and then in a direction substantially at right angles to the plane of the plate member, forming an annular flange 4 of greater diameter than the pipe aperture. The outwardly bent portion 3 of the flange member is preferably in contact with the plate member, around and adjacent to the central pipe aperture as shown in Fig. 6, thus enabling said parts to mutually reinforce each other.

The plate member 1 is provided with any desired number of bolt holes 5, 5, etc., arranged around the central aperture 2, and marginal portions of the plate member are bent up (on the same side as the flange member) and preferably between adjacent bolt holes, as at 6, 6, etc., the central portions of the bent up marginal portions 6 being in substantially tangential contact with the exterior of the flange member throughout substantially the entire height of the portion 4, as indicated in Fig. 6, and serving to reinforce said flange member, while at the same time adding greatly to the stiffness and rigidity of the plate member. The bent up marginal portions 6, are ordinarily curved inwardly as indicated in Fig. 6, and their intersection with the plane of the plate member 1 ordinarily follows the same curve as there shown. The extent of curvature depends upon the number of bolt holes and the distance between them and the flange member, and in some cases where a small number of bolt holes are employed, the marginal portions 6 can be bent up on a straight line so as to bring their central portions into substantially tangential contact with the outer surface of the flange member.

In Fig. 3 we have illustrated the blank from which we prefer to form our improved ring, and in Figs. 4 and 5 the blank is shown in successive stages of its formation. The blank consists of a flat annular plate A (Fig. 3) having its central aperture smaller than the desired pipe aperture of the ring. The flange member is formed preferably by binding or forging by means of dies or otherwise the inner portions of the blank so that they shall stand substantially perpendicularly to the plane of the plate member, as indicated in Fig. 4, in which 1$^a$ represents the embryo plate member, 4$^a$ the embryo flange member, 2$^a$ the central pipe aperture. The flange portion 4$^a$ is then preferably expanded laterally so as to bend portions thereof (3) backward sharply from the central pipe aperture and into contact with the portions of the plate member surrounding the pipe aperture, as clearly shown in Fig. 5, which is a section of the completed ring taken through opposite bolt holes. The marginal portions of the plate member between the bolt holes are forged or bent up into substantially tangential contact with the expanded portion 4 of the flange member, as shown in Fig. 6, and we also prefer to bend up the edge portions of the plate member slightly adjacent to the bolt holes, to form an exterior reinforcing flange 7 (see Figs. 1, 2 and 5) although this is not absolutely essential and may be omitted. The bolt holes 5 can be formed in the plate member by punching, drilling or otherwise, as preferred and at any preferred point in the formation of the ring structure or after its completion. We do not limit ourselves to the formation of the ring in the manner described, although we prefer to form it in this manner.

In Figs. 7, 8 and 9 we have illustrated a slightly modified form of the ring, embodying our invention. In this form, the expanded portions 4$^b$ of the ring is provided at its outer end with an exterior annular projection, bead or shoulder 8, preferably having its under face perpendicular to the axis of the ring. The marginal portions 6$^b$ of the plate member 1$^b$, is bent up into contact with the expanded portion 4$^b$ of the flange member, and its upper edge engages the underside of the shoulder or bead 8, as clearly shown in Figs. 8 and 9 thus giving a further reinforcement to the outer edge of the flange member, and further stiffening the structure of the ring. The ring shown in Figs. 7, 8 and 9 is identical with that shown in Figs. 1, 2, 5 and 6, except for the particulars above described.

What we claim and desire to secure by Letters Patent is:—

1. A clamping ring for pipe couplings comprising a plate member disposed perpendicularly to the axis of the ring, and having a central pipe aperture, an annular flange member of greater diameter than the said pipe aperture integrally united to the plate member, and extending substantially perpendicularly therefrom, said plate member being provided at intervals exteriorly to the flange member with bolt holes, and being provided with reinforcing portions between the bolt holes engaging the outer surface of the annular flange member, said reinforcing portions being perpendicular to the plate member and disposed in a curved line reverse to the curvature of the flange member, and substantially tangential thereto.

2. A clamping ring for pipe couplings formed from a single piece of wrought metal sheet, and comprising a plate member disposed perpendicularly to the axis of the ring and having a central pipe aperture, an annular flange member of greater diameter than the pipe aperture integrally united to the plate member adjacent to the said pipe member, said plate member being provided at intervals around the exterior of the flange member with bolt holes, and having reinforcing portions between adjacent bolt holes bent perpendicularly to the plane of the plate member and curved inwardly oppositely to the curvature of the annular flange member, the central portions of said inwardly curved portions having a substantially tangential contact with the outer face of the annular flange member.

3. A clamping ring for pipe couplings formed from a single piece of wrought metal sheet, and comprising a plate member disposed perpendicularly to the axis of the ring and having a central pipe aperture, an annular flange member of greater diameter than the pipe aperture integrally united to the plate member adjacent to the said pipe member, said plate member being provided at intervals around the exterior of the flange member with bolt holes, and having reinforcing portions between adjacent bolt holes bent perpendicularly to the plane of the plate member and curved inwardly oppositely to the curvature of the annular flange member, the central portions of said inwardly curved portions having a substantially tangential contact with the outer face of the annular flange member, the annular flange member having portions at its upper edge projecting outwardly therefrom above the upper edges of the tangentially contacting reinforcing portions of the plate member.

In testimony whereof we affix our signatures, in the presence of two witnesses.

FRANK N. SMITH.
GEORGE P. BOOTHE.

Witnesses:
H. M. WICK,
M. E. CLARK.